United States Patent [19]
Sanford, II et al.

[11] Patent Number: 5,819,289
[45] Date of Patent: Oct. 6, 1998

[54] DATA EMBEDDING EMPLOYING DEGENERATE CLUSTERS OF DATA HAVING DIFFERENCES LESS THAN NOISE VALUE

[75] Inventors: Maxwell T. Sanford, II; Theodore G. Handel, both of Los Almos, N. Mex.

[73] Assignee: The Regents of the University of California, Los Almos, N. Mex.

[21] Appl. No.: 855,243

[22] Filed: May 13, 1997

Related U.S. Application Data

[63] Continuation-in-part of Ser. No. 626,836, Apr. 2, 1996, abandoned.

[51] Int. Cl.$^6$ .................................................. G06F 17/30
[52] U.S. Cl. ............................ 707/104; 707/100; 380/28; 380/3; 382/232
[58] Field of Search .................................. 707/104, 100; 380/28, 3; 382/232

[56] References Cited

U.S. PATENT DOCUMENTS

| | | | |
|---|---|---|---|
| 5,434,649 | 7/1995 | Hasuo et al. | 399/366 |
| 5,493,677 | 2/1996 | Balough et al. | 707/104 |
| 5,530,759 | 6/1996 | Braudaway et al. | 380/54 |
| 5,568,570 | 10/1996 | Rabbani | 382/238 |
| 5,613,004 | 3/1997 | Cooperman et al. | 380/28 |
| 5,617,119 | 4/1997 | Briggs et al. | 707/100 |
| 5,636,292 | 6/1997 | Rhoads | 382/232 |
| 5,646,997 | 7/1997 | Barton | 380/23 |
| 5,659,726 | 8/1997 | Sanford, II et al. | 707/101 |
| 5,664,018 | 9/1997 | Leighton | 380/54 |
| 5,687,236 | 11/1997 | Moskowitz et al. | 380/28 |
| 5,689,587 | 11/1997 | Bender et al. | 382/232 |
| 5,699,427 | 12/1997 | Chow et al. | 380/3 |
| 5,710,834 | 1/1998 | Rhoads | 382/232 |
| 5,727,092 | 3/1998 | Sanford, II et al. | 382/251 |
| 5,734,752 | 3/1998 | Knox | 382/212 |

OTHER PUBLICATIONS

Boland, "Watermarking Digital Images for Copyright Protection", Fifth International Conference on Image Processing and Its Applications, 4–6 Jul. 1995, pp. 326–330.

Cox et al., "A Secure, Imperceptible, Yet Perceptually Salient, Spread Spectrum Watermark for Multimedia", Southcon/96 Conference Record, Orlando Florida, 25–27 Jun. 1996, pp. 192–197.

O'Ruanaidh et al, "Watermarking Digital Images for Copyright Protection", IEE Proceedings–Vision, Image, and Signal Processing, vol. 143, No. 4, Aug. 1996, pp. 250–256.

Komatsu et al, "Authentication System Using Concealed Image in Telematics", Memoirs of the School of Science and Engineering, Waseda University, No. 52, Oct., 1988, pp. 45–60.

M.T. Sanford et al., "The Data Embedding Method", SPIE vol. 2615, 23 Oct. 1995, pp. 226–259.

Tanaka et al., A Visual Retrieval System With Private Information for Image Database, Proceedings, International Conference on DSP Applications and Technology, Oct. 1991, pp. 415–421.

Van Schyndel et al., "A Digital Watermark", Proceedings ICIP–94, Austin, Texas, 13–16 Nov. 1994.

Jochen Rindfrey, "Towards an Equitable System for Access Control and Copyright Protection in Broadcast Image Services; The Equicrypt Approach", Intellectual Property Rights and New Technology, Proceedings of the Conference, (Verlag (Munchen, 1995), pp. 1–1.

Macq et al., "Cryptology for Digital TV Broadcasting", Proceedings of the IEEE, vol. 83, No. 6, Jun. 1995, pp. 944–957.

*Primary Examiner*—Paul R. Lintz
*Attorney, Agent, or Firm*—Milton D. Wyrick

[57] ABSTRACT

A method of embedding auxiliary information into a set of host data, such as a photograph, television signal, facsimile transmission, or identification card. All such host data contain intrinsic noise, allowing pixels in the host data which are nearly identical and which have values differing by less than the noise value to be manipulated and replaced with auxiliary data. As the embedding method does not change the elemental values of the host data, the auxiliary data do not noticeably affect the appearance or interpretation of the host data. By a substantially reverse process, the embedded auxiliary data can be retrieved easily by an authorized user.

18 Claims, 35 Drawing Sheets

Computer code for determining pair values.

line 1 `for(i = 0; i < (int)bh.colors; i++) {`
```
        int avg;
        if(i % 10 == 0)fprintf(stderr,".");
        c1.red = colormap[i].r;
        c1.grn = colormap[i].g;
        c1.blu = colormap[i].b;
```
line 7     `if(greyscale) {`
```
                avg = (int)(c1.red + c1.grn + c1.blu)/3;
                if(avg==0)continue;
                if(avg!=c1.red || avg!=c1.grn ||
                    avg!=c1.blu)continue;
        }
```
line 12    `(void)rgbhsi(&c1, &d1);    /* convert to HSI components */`
```
        if((int)d1.inten == 255)unused++;
        old_diff = 0.f;
        if((int)d1.inten==0 || (int)d1.inten==(int)bh.colors)continue;
```
line 16    `for(j=i+1; j < (int)bh.colors; j++)   {`
```
            c2.red = colormap[j].r;
            c2.grn = colormap[j].g;
            c2.blu = colormap[j].b;
```
line 20    `(void)rgbhsi(&c2, &d2); /* convert to HSI components */`
```
            color_diff = d2.hue - d1.hue;
```

Figure 3A

```
                    /* hue & inten. difference must be ok */
                    if(!greyscale)    {
line 24             if((abs((int)color_diff) < COLOR_NOISE)\
                        && (color_diff < old_diff)\
                        && ((int)fabs((double)(d2.inten-d1.inten)) <
                    INTEN_NOISE) ) {
                            if(k>(int)bh.cols/2 -1)break;
                            pair[k].i = i;
                            pair[k].j = j;
                            pair[k].count = 0;
                            k++;
                            old_diff = color_diff;
                        }
                    }
line 35             else {
                        avg = (int)(c2.red + c2.grn + c2.blu)/3;
                        if(avg==0)continue;
                        if(avg!=c2.red || avg!=c2.grn || avg!=c2.blu)continue;
                        if( (int)fabs((double)(d2.inten-d1.inten))<
                            INTEN_NOISE &&
                                (int)fabs((double)(d2.inten-d1.inten)) !=0)   {
                                    if(k>(int)bh.cols/2 -1)break;
                                    pair[k].i = i;
                                    pair[k].j = j;
```

Figure 3B

```
                        pair[k].count = 0;
                        k++;
                    }
                }
            } /* j loop */
            if(k>(int)bh.cols/2 -1)break;
        } /* i loop */
line 51     no_pairs = k;
```

Figure 3C

Computer code to eliminate duplicate pairs.

line 1
```
for(i=0;i<k;i++) {
    pair[i].count += (hist_values[pair[i].i] +
        hist_values[pair[i].j]);
    if(pair[i].i==0 || pair[i].j==0)pair[i].count = 0;
}
```
line 5
```
p_sort(pair, k);
no_pairs = duplicate (k, pair);
total = 0;
for(i=0;i<no_pairs;i++)
    total += pair[i].count;
```
line 10
```
total /= 8;
value = (float)total - (float)NCOLS;
if(value > 0.f) fprintf(stderr,"\n%.1f Kb embedding space
    located", value/1000.f);
if(value == 0.f)fprintf(stderr,"\nNo embedding space available in
    this image");
if(value < 0.f) fprintf(stderr,"\nInsufficient embedding space");
```

Figure 4

Computer code constraining pair values for Truecolor images.

line 1  /* Find histogram point-pairs within RANGE counts, within 10% in number */

```
        for(ip=0;ip<3;ip++)   {
            int nstart;
            long li;
            fprintf(stderr,"\nAnalyzing intensity histogram for plane %d", ip);
```
line 6        for (i=0;i<256;i++) {
```
                fvalue[i]=(float)hist_values[ip*256+i];
            }
            nstart = RANGE;
            k = 0;
            while(nstart<256 && k<(int)bh.cols/2)     {
```
line 12               for (i=nstart;i<256;i++) {
```
                    for(j=i-1;j>i-RANGE;j--) {
                        li = hist_values[ip*256+i];
                        if((int)(fvalue[j]*fvalue[i])==0)break;
                        if((float)fabs((double)(fvalue[j]-fvalue[i]))\
```
line 17                      < 0.05f*(fvalue[j]+fvalue[i])) {
```
                            pair[k].i = i;
                            pair[k].j = j;
                            pair[k].count = li + hist_values[ip*256+j];
                                k++;
```

Figure 5A

```
                    if(k>(int)bh.cols/2-1)break;
                }
            } /* end of inner pixel comparison loop
                     (j) */
            if(k>(int)bh.cols/2-1)break;
        } /* end of outer pixel comparison loop (i) */
line 27     p_sort(pair, k);
        no_pairs = duplicate (k, pair);
        k = no_pairs;
            if(verbose)fprintf(stderr,"%3d pairs\r", k);
line 31         nstart = i;
    } /* end of while loop */
```

Figure 5B

Computer code for embedding auxiliary data.

/*————————————————EMBEDDING CODE————————————————*/
/* lj,    index over pixels in the image-data
    inrow,     index within the image-data row buffer
    nrow, row number in the image-data
    li,    index over pixels in the data-image
    d_inrow,  " within the data-image row buffer
    k,    index within the PAIRS structure array
    maxval,  no. of bits embedded
    bitindex, bit position within the data-image byte
    byteplace, position for read/write in tape6 file

*/ line 1  data_row = (unsigned char *)malloc((size_t)NCOLS);
        if(data_row==NULL) {
        pm_error("Data row data allocation failed!");
        return(1);
        }
        maxval = bit_place_index.maxval;
        d_inrow = bit_place_index.d_inrow;
        bit_place_index.li += d_inrow;
        lj = (long)krow;
        k = 0;
        nrow = -1;

line 12    for(li=bit_place_index.li; li<length-NCOLS; li++)   {
        bit_place_index.li = li;

line 14        if(li == -512L)   {    /* header information */
            byteptr=(unsigned char *)&data_header;
            for(d_inrow=0;d_inrow<sizeof(data_header);d_inrow++)
                data_row[d_inrow]=*(byteptr+d_inrow);
            d_inrow = 0;
        }

Figure 6A line 20    if((li >= 0L && (li % (long)NCOLS) == 0L) || reread != 0)
           { /* next row of data-image */
           j = fgetpos(tape5,&tape5_pos);
           j = fread(data_row, 1, (size_t)NCOLS, tape5);
           if(!reread) {
                   for(i=0;i<j;i++) checksum += data_row[i];
                   d_inrow = 0;
                   bit_place_index.d_inrow = 0;
                   }
           reread = 0; /* turn off flag for re-read on next Truecolor
                   plane */
           }
line 30    for (bitindex=bit_place_index.bitplace;
                   bitindex<NO_BITS; bitindex++) {
           bit_place_index.bitplace = bitindex;
line 32        if((lj-krow) % (long)(BYTES_IN_ROW) == 0L) {
                   if(nrow >= 0) {        /* write only after you read */
                           inrow = fseek(tape6, byteplace, SEEK_SET);
                           inrow =fwrite(image_row,1,(size_t)
                                   (BYTES_IN_ROW),tape6);
                           byteplace += inrow;
                           byteplace += pad; /* skip pad bytes */
                           inrow = krow;
                           }
line 40    if(lj/(long)OFFSET == 0L ||
           (lj+(BYTES_IN_ROW+pad))/
           (BYTES_IN_ROW+pad) > (unsigned \long)bh.rows)
                           {
                           if(bailout()) { /* end of
                           image-data--user
                           termination */
                               i = 1;

Figure 6B line 47

```
                    goto QUIT;
                  }
                  if(k==no_pairs)goto PLANE;  /* next plane of
                          image */
                  lj = krow;   /* pick next pair and start over */
                  pvalue.i=(unsigned int)pair[k].i;  /*zero*/
                  pvalue.j =(unsigned int)pair[k].j; /* one */
                  if(verbose && k>0) fprintf(stderr," %ld    ",
                          pvalue.count);
                  pvalue.count = 0L;
                  if(verbose) fprintf(stderr,"\rEmbedding Pair
                          %2d\ (%3d,%3d)",\
                          k, pvalue.i, pvalue.j);
                  else fprintf(stderr,".");
                  k++;
                  byteplace = bh.pixeloffset;
                }
``` line 60
```
                nrow = (int)((lj-krow)/((long)BYTES_IN_ROW+pad));  /*
                        read next row */
                inrow = fseek(tape6, byteplace, SEEK_SET);
                inrow = fread(image_row,1,(size_t)
                        BYTES_IN_ROW,tape6);
                inrow = krow;
              } /* end new row (lj) test */
          /* Embed one byte */
            if(ip>=0 && pair[k-1].count==0) {  /* finished a pair */
                lj +=OFFSET;
                inrow += OFFSET;
                bitindex--;
                continue;
            }
```

Figure 6C line 72          if((int)image_row[inrow]==pvalue.i) {     /* find a zero
                         value */
                         if(test((int)data_row[d_inrow],bitindex))
                                  image_row[inrow]=(unsigned char)pvalue.j;
                                  maxval++;
                         if(pair[k-1].count==0)   {
                                  pm_error("\nPair count error!");
                                  i = 1;
                                  goto QUIT;
                         }
                         pair[k-1].count--;
                         pvalue.count++;
                         if(bitindex==NO_BITS-1)bit_place_index.bitplace
                                  =0;
                }
line 84          else bitindex--;    /* haven't got this bit yet! */
                 lj+=OFFSET;
                 inrow+= OFFSET;
                 } /* end of bitindex loop */
        d_inrow++;
        } /* end of li (data index) loop */

Figure 6D

Construction of auxiliary data

Line 1
```
if(bh.bitsperpixel==TRUECOLOR || uniform_pallet) {
    fprintf(stderr,"\nConstructing data from image plane %d", ip);
``` line 3
```
    memset(index_table,0,sizeof(index_table));
    /* create the index table used for decoding data */
    no_pairs = tc_pair[ip].no_pairs;
``` line 6
```
    for(i=0;i<no_pairs;i++) {
        pair[i].i = (color_pair[ip]+i)->i;
        pair[i].j = (color_pair[ip]+i)->j;
        pair[i].count = (color_pair[ip]+i)->count;
    }
    no_tables = tc_tables[ip].no_tables;
``` line 13
```
    if(no_tables) { /* set the table data for the color plane */
    if(ip==0) tape99 = fopen(color_file,"rb");
    _fmemset(&ctable,0,sizeof(ctable));
    for(i=0;i<no_tables;i++) {
        j = fread((void *)(&ctable[i]),sizeof(struct CLUSTER),1,tape99);
        if(!j) {
            fprintf(stderr,"\nTable File data error. Table %d", i);
            if(rowbuf)free(rowbuf);
            rowbuf = NULL;
            i = 1;
            goto QUIT;
        }
        j = 0;
        ctable[i].total = ctable[i].ncluster;
        while(ctable[i].total) {
            j++;
            ctable[i].total /= 2;
        }
        ctable[i].total = j-1;
    }
``` line 35
```
    }
```

Figure 7A line 36
```
    for(i=0;i<no_pairs;i++) {
```

```
                index_table[pair[i].i] = 100 + i;
                index_table[pair[i].j] = 100 + i;
            }
        for(i=0;i<no_tables;i++) {
            for(k=0;k<ctable[i].ncluster;k++)
                index_table[ctable[i].values[k]] = 200 + i;
            }
        }
```

/*          ----code to construct auxiliary data----
    lj,     index over all the pixels in the image data
    inrow,  index within the image-data row buffer
    nrow,   row number in the image data
    k,      index of the PAIRS or CLUSTER structure array
    maxval, no. of bits embedded
    byteplace, position for read/write in tape6 file
    krow    offset in the byte sequence of pixel values (BGR plane offset) */
krow = ip;
krow = max(0,krow);
rewind(in);
maxval = bit_place_index.maxval;
if(maxval==0L) bit_place_index.li = -NCOLS;
        /* set index for start of header data */

/* --------One pass through the image plane constructs the pair and
table values --------------------*/
if(no_pairs) fprintf(stderr,"\nPlane %d: %d pairs ",ip,no_pairs);
if(no_tables)fprintf(stderr,"and %d tables ", no_tables);
fprintf(stderr,"\n");

byteplace = bh.pixeloffset;

Figure 7B

```
                    /* start of image data */
for(lj=krow;lj<(long)(bh.rows*BYTES_IN_ROW);lj+=BYTES_IN_ROW
) {    /* loop by rows over all the pixels in the image */
        nrow = (int)((lj-krow)/((long)BYTES_IN_ROW));
        /* calculate row index */
        inrow = fseek(in, byteplace, SEEK_SET);
                /* read a row of pixels from the image */
        inrow = fread(rowbuf,1,(size_t)BYTES_IN_ROW,in);
    byteplace += inrow;
    if(nrow) {
                /* skips constructing from the key row */
        for(inrow=krow;inrow<(long)BYTES_IN_ROW;inrow+=OFFSET
        ) {    /* index across the pixels in the row */
                    j = index_table[rowbuf[inrow]];
                    if(j) {
                            pixel_count++;
                            k = (j+1)/200;
                            if(!k) {
                            j=ExtractPairs(&rowbuf[inrow],j%100,&maxval);
                                    if(iheader==-1) {
                                            i = -1;
                                            goto QUIT;
        /* header failed to verify */
                                    }
                                    if(iheader)
        if(maxval==(data_header.fsize+NCOLS)*NO_BITS)break;
                            }
                            else {
                                    j =
        ExtractTables(&rowbuf[inrow],j%200,&maxval);
                                    if(iheader)
```

Figure 7C

```
                if(maxval==(data_header.fsize+NCOLS)*NO_BITS)break;
              }
            }
          if(tape5==NULL)break;
                /* check for header byte error */
              if(mod_block_size)
ExtractSlicedBits(&rowbuf[inrow],&maxval);
              }

}
        }
      } /* end new row (lj) test */
```

Figure 7D

Computer code locating generalized degenerate values for Truecolor images.

```
            total = 0L;
line 2      case TRUECOLOR:
                if(fvalue == NULL) {
                    fprintf(stderr,"\nTruecolor memory allocation error");
                    pbm_freerow(image_row);
                    free(hist_values);
                    return(exit_code=1);
                }
line 9      if(table_flag) {          /* Section for table-embedding */
                nvalue = (unsigned int *)_fmalloc(sizeof(int)*256);
                htable = (int *)_fmalloc(sizeof(int)*256);
                if(nvalue == NULL || htable == NULL) {
                    fprintf(stderr,"\nTruecolor histogram table
                            memory allocation error");
                    pbm_freerow(image_row);
                    free(hist_values);
                    free(fvalue);
                    if(nvalue)free(nvalue);
                    if(htable)free(htable);
                    return(exit_code=1);
                }
```

Figure 8A

```
           /* Loop over the three color planes in Truecolor image */
line 23    for(ip=0;ip<3-uniform_pallet*2;ip++) {
                   unsigned int ncluster, navg, nx;    /* cluster index */
                   unsigned int hmax_value= 0;         /* histogram
                                                         maximum ordinal value */
                   unsigned int hist_start;            /* histogram table
                                                         starting value */
                   unsigned int hist_stop;             /* histogram table
                                                         stopping value */
                   unsigned int htest;                 /* test value in
                                                         histogram ordinate loop */
                   unsigned int li, lj;                /* histogram values &
                                                         indices */
                   int error;         /* error band for pixel values */
                   int cndx;          /* index in cluster structure tables */
                   int pcnt;          /* index in pair table */
                   int n;             /* no. of pairs in a cluster */
                   int l;             /* general purpose loop index */
                   long diff;         /* histogram difference value */
                   long ip_total;     /* total embedding bytes in a plane */
                   fprintf(stderr,"\nBuilding histogram frequency table
                                                         for plane %d", ip);
line 44            for (i=0;i<256;i++) {
                           nvalue[i]= (unsigned int)hist_values[ip*256+i];
                           hmax_value = __max(hmax_value,nvalue[i]);
                   }
line 48            hist_stop = hmax_value - hmax_value*RANGE/100;
```

Figure 8B

```
            n = 0;
            htest = 0;
            cndx = 0;
            pcnt = 0;
            no_pairs = 0;
            ip_total = 0L;
line 55     for (li=htest;li<hist_stop;li++) {
                j = (li+1)*RANGE/100;
                hist_start = li;
                if(j > (int)htest)break;   /* start where hist error is greater
                                              than 1 */
            }
line 61     htest = j/2 +1;
            for(li = hist_start;li <= hist_stop; li += htest) { /* step
                                              through histogram ordinate values */
                lj = li*RANGE/100;
                htest = __max(htest,lj);
                n = 0;
line 67         for (i=0;i<256;i++) {   /* step through
                                              histogram abcissa values */
                    diff = nvalue[i] - li;
                    if(diff < 0)diff = -diff;
```

Figure 8C line 71    if((unsigned)diff <= htest) {
                htable[i] = i;
                n++;
           }
           else htable[i] = 0;
           }
line 77    if(n <= 2) continue;   /* need at least 2 values in ordinate error
                                                                  range */
           /* find & tablulate clusters of degenerate pixel (abcissa) values */
line 80 for (i=0;i<256;i++) {
                ncluster = 0;
                if(htable[i]) {    /* found a non-zero abcissa value */
                        error = 2*RANGE*htable[i]/100;
                        j = i + error;
                        j = min(j,256);
                        /*    tabulate no. of abcissa values in error range */
line 87                 for (k=i;k<j;k++) {
                                if(htable[k])ncluster++;
                        }
                }
line 91    if(ncluster > 32)ncluster = 32;
           if(ncluster >= 16 && ncluster < 32)ncluster = 16;
           if(ncluster>=8&&ncluster<16)ncluster = 8;
           if(ncluster>=4&&ncluster<8) ncluster = 4;

Figure 8D line 95      if(ncluster >=4) { nx = ncluster;      /* nx is temporary decrement
                                     counter for the next loop */
             ctable[cndx].ncluster = nx;
             if(nx==8) ctable[cndx].total = 3;
             if(nx==16)ctable[cndx].total =4;
             if(nx==32)ctable[cndx].total = 5;
             navg = 0;
             lj = (unsigned)nx;

line 104     for(k=i;k<j;k++) {
                 if(htable[k]) {
                     if(check_table(htable[k],cndx))continue;
                     nx--;
                     ctable[cndx].values[nx] = htable[k];
                     navg += htable[k];
                     if(nx == 0) {
                         ncluster = 0;
                         break;
                     }
                 }
             } line 116     if(nx) goto DEUX;    /* if any values left over owing to
                                     duplicates treat the cluster as
pairs */ navg /= (int)lj;
             i = j+1;
             fprintf(stderr,"\n%d pixel cluster at value %d", (int)lj,navg);

Figure 8E

```
              if(verbose) {
                      fprintf(stderr,"\n");
                      for(k=0;k<ctable[cndx].ncluster;k++)
                      fprintf(stderr,"%4d",ctable[cndx].values[k]);
                      }
line 126              for(k=0;k<ctable[cndx].ncluster;k++) {
                              /* each pixel value in the table can encode any of
                                      8*3 bits, for ncluster = 8 */
                              j = ctable[cndx].values[k];
                              ip_total +=\
                              ctable[cndx].ncluster*ctable[cndx].total*nvalue[j];
                              }
                      cndx++;
line 134              }
              else { /* process the htable values for pair-embedding */
       DEUX:   n = ncluster/2;        /* no. of possible pairs */
                      ncluster = 0;
                      pcnt = no_pairs;
line 139              while(n) {
                              for(k=i;k<j;k++) {
                                      if(htable[k]) { /* this test takes out the pairs
                                                      from the cluster */
```

Figure 8F

```
                    pair[pcnt].i = htable[k];
                    li = (unsigned)nvalue[k];
                    for(l=k+1;l<j;l++) {
                        if(htable[l]) {
                            pair[pcnt].j = htable[l];
                            pair[pcnt].count = li + nvalue[l];
                            pcnt++;
                            n--;
                            i = l+1;
                            k = l;
                            break;
                        }
                    }
line 156            if(n==0)break;    /* found all the pairs in
                                         the cluster */
                    if(no_pairs>(int)bh.cols/2-1)break;
                }
            }
        }
        no_pairs = pcnt;
    }
line 164    }    /* i loop end */
        memset(htable,0,sizeof(htable));
    } /* li loop */
```

Figure 8G

/* remove pairs overlapping the table entries & total embedding space */
line 168    if(no_pairs) {
                for (j=0;j<no_pairs;j++) {
                for(i=0;i<cndx;i++) {
                        for(k=0;k<ctable[cndx].ncluster;k++) {
                                if(pair[j].i == ctable[cndx].values[k])
                                        pair[j].count = 0L;
                                if(pair[j].j == ctable[cndx].values[k])
                                        pair[j].count = 0L;
                        }
                    }
                }
                p_sort(pair, no_pairs);
                no_pairs = duplicate (no_pairs, pair);   /* remove zero-count
pairs                                                                     */
                fprintf(stderr,"\n%d embedding pairs located", no_pairs);
                if(verbose) {
                        for (j=0;j<no_pairs;j++) {
                                fprintf(stderr,"\nPair %d: %3d,%3d", j, pair[j].i,
                                                pair[j].j);
                                ip_total += pair[j].count;
                        }
                }
        }

Figure 8H

```
ip_total /= 8L;
total += ip_total;
fprintf(stderr,"\nPlane %d total %ld bytes",ip, ip_total);
ip_total = 0L;
memset(ctable,0,sizeof(ctable));
memset(pair,0,sizeof(pair));
} /* ip loop */
if(nvalue)free(nvalue);
if(fvalue)free(fvalue);
if(htable)free(htable);
} /* end of table_flag option */
```

Figure 8I

Computer code to analyze lengths of runs.

line 1     int rowstats(unsigned char *data_row, long *histogram, int ncols, int packet_size) { int i, j, k, l;    /* loop counters */ int runs=0;    /* return value */ int count;    /* no. of pixels in the run */ char letter = 'A';    /* starting code for flagging runs in the row */ unsigned char block[MAXRUN+3];    /* a block containing the run being examined */

/* find first bit in the row & adjust as a packet flag */ if(packet_size >=0) { line 9     j = packet_col(data_row, packet_size, ncols);

} if(ncols <=0) return(-1);

line 12    for(i=MINRUN;i<=MAXRUN;i+=2) { /* i is the runlength being searched */ k = 0;

for(j=1;j<ncols;j++) { /* NOTE: data_row[0] is assumed to be zero!! */ line 15    if(data_row[j]==(unsigned char)ONE) { if(data_row[j-1]!=(unsigned char)ZERO) continue;

Figure 9A

```
                    k = j;  /* a block start */
                }
            else continue;
        /* find a block of data ending with a zero pixel */
line 21     if(k+i+2 > ncols) break;
line 22     for(l=k;l<k+i+3;l++) block[l-k] = data_row[l];
            l = j;
line 24     if(block[i+1] != (unsigned char)ZERO) goto NEXT;
            if(block[i+2] > (unsigned char)ONE ) goto NEXT;
        /* examine block for pixel count */
            count = 0;
line 28     for(l=0;l<i;l++) {  /* all but last bit in block must = 1 */
                if(block[l]==(unsigned char)ONE) count++;
            }
line 31     count++;
            l = j+1;
line 33     if(count == i+1) {  /* set all but last pixel in run to flag value */
                if(histogram != NULL)histogram[i]++;
                                                runs++;
line 36         for(l=j;l<j+count-1;l++) data_row[l] = letter;
            l++
            }
            NEXT: for(j=l+1;j<NCOLS;j++) if(data_row[j]==(unsigned
                        char)ZERO)break;
```

Figure 9B

```
} /* end of row (j) loop */
letter++;
} /* end of run (l) loop */ return(runs);
}
```

Figure 9C

Computer code to set PACKET_START pixel flag.

```
int packet_col(unsigned char *data_row, int packet_size, int
        ncols) {  int i;
/* find first bit in the row & adjust as a packet flag */
```
line 4     `for(i=1;i<ncols;i++)    {`
line 5         `if(data_row[i]==(unsigned char)ZERO) {`

```
            if(packet_size<0) break;
            if(packet_size>0)   {    /* first bit set to an even
                                        column */
                if(i%2 == 0)break;
                data_row[i] = (unsigned char)ONE;
            }
```
line 11         `else { /* first bit set to an odd column */`
```
                if(i%2 != 0)break;
                data_row[i] = (unsigned char)ONE;
            }
        }
    }
```
line 17   `if(i==ncols)return(-1);`   `/* no black pixels in the row */`
       `if(packet_size>=0) return(i);`   `/* index of the first black pixel */`
       `if(i%2) return(1);`        `/* if(packet_size==-1) return odd */`
       `else  return(0);`         `/*                  return even */`
`}`

Figure 10

Computer code to embed data in two-color images.

line 1    READLINE:    nrow = (int)(lj/((long)bh.cols));   /* read data from next row */

```
            if(verbose) {
                    if(nrow==0)fprintf(stderr,"\n");
                    fprintf(stderr,"\rrow %4d", nrow);
            }
            else motion(stderr);
            bit_count = 0;
            image_row[0] = 0;    /* row buffer always starts
                                        with a zero */
            if(verbose==2 && nrow <=61)fprintf(tape9,"\nnrow
                    byteplace %d %ld",    nrow,byteplace);
            inrow = fseek(tape6, byteplace, SEEK_SET);
            writeplace = byteplace;
```
line 12    `for(j = 1; j < (int)bh.cols+1; j++) {`
```
                    int pix;
                    if(bit_count <= 0) {   /* need another byte */
                            bit_count = 8;
                            bit_store = pbm_getrawbyte(tape6);
                            byteplace++;
                    }
```

Figure 11A

```
                    bit_count -= bh.bitsperpixel;
                    pix = ( bit_store >> bit_count ) & mask;
                    image_row[j] = (unsigned char)pix;
                    #ifdef INSERT_KEY
                    /* key row set to zero to hold key pairs */
                    if(nrow == KEYLINE)image_row[j] = (unsigned
                            char)ZERO;
                    #endif
line 26             } /* cols */
                    byteplace += pad;
line 28             j = packet_col(image_row,-1,(int)bh.cols);
                    i = rowstats(image_row,NULL,(int)bh.cols+1,-1);    /*
                            flag the embedding pixels */
                    if(verbose==2) fprintf(tape9,"\n nrow,i,j: %d %d
                            %d", nrow,i,j);
line 31             if(j<0 || i==0)    { /* a row of white pixels or no
                            pixels for embedding    */
                        if(nrow+1<(int)bh.rows) {
                            lj += bh.cols;
                            goto READLINE;
                        }

}
line 37             if(j==1 && kp==0) {
```

Figure 11B

```
                    fprintf(stderr,"\nPacket start-index error,
                            packet %d", packet_no-1);
                    goto QUIT;
                    }
line 41         if(j==0 && kp > 0) {
                    fprintf(stderr,"\nContinuation packet-index
                            error, packet %d", packet_no-1);
                    goto QUIT;
                    }
                inrow = 1;
                if(kp==0 && verbose==2)
                    fprintf(tape9,"\nPacket start-row %d, bits found
                            %d",nrow,i);
                kp++;
line 49         } /* end new row (lj) test */
        /* Embed one byte, use all pairs for each row */
line 51 for(k=0;k<no_pairs;k++) {
                if(pair[k].count<0) {
                    pm_error("\nPair count error!");
                    i = 1;
                    goto QUIT;
                    }
line 57         testltr = (unsigned char)(letter+(unsigned char)pair[k].i/2 -
                        1);     /* flag letter */
```

Figure 11C

```
            if(image_row[inrow]==testltr)    {        /* find a flagged run
                */
            if(verbose==2 && nrow==60) fprintf(tape9,"inrow %d",
                inrow);
line 60     inrow += (unsigned int)pair[k].j;
            lj += pair[k].j;
line 62     if(test((int)packet[inpacket_row],bitindex)) image_row
                [inrow-1]=1;
            else image_row[inrow-1]=0;
```

Figure 11D

DATA EMBEDDING EMPLOYING DEGENERATE CLUSTERS OF DATA HAVING DIFFERENCES LESS THAN NOISE VALUE

BACKGROUND OF THE INVENTION

FIELD OF THE INVENTION

The present application is a continuation-in-part application out of continuation-in-part application Ser. No. 08/626,836, filed Apr. 2, 1996 now abandoned.

The present invention generally relates to digital manipulation of numerical data and, more specifically, to the embedding of external data into existing data fields. This invention was made with Government support under Contract No. W-7405-ENG-36 awarded by the U.S. Department of Energy. The Government has certain rights in the invention.

The use of data in digital form is revolutionizing communication throughout the world. Much of this digital communication is over wire, microwaves, and fiber optic media. Currently, data can be transmitted flawlessly over land, water, and between satellites. Satellites in orbit allow communication virtually between any two points on earth, or in space.

In many situations, it may be of benefit to send particular secondary, or auxiliary data along with the primary data. Secondary data could involve the closed captioning of television programs, identification information associated with photographs, or the sending of covert information with facsimile transmissions. Such a technique is suited also for use as a digital signature verifying the origin and authenticity of the primary data.

Data in digital form are transmitted routinely using wideband communications channels. Communicating in digital fashion is facilitated greatly by error-correcting software and hardware protocols that provide absolute data fidelity. These communication systems ensure that the digital bit stream transmitted by one station is received by the other station unchanged.

However, most digital data sources contain redundant information and intrinsic noise. An example is a digital image generated by scanning a photograph, an original work of electronic art, or a digitized video signal. In the scanning or digital production process of such images, noise is introduced in the digital rendition.

Additionally, image sources, such as photographic images and identification cards, contain noise resulting from the grain structure of the film, optical aberrations, and subject motion. Works of art contain noise which is introduced by brush strokes, paint texture, and artistic license.

Redundancy is intrinsic to digital image data, because any particular numerical value of the digital intensity exists in many different parts of the image. For example, a given gray-level may exist in the image of trees, sky, people or other objects. In any digital image, the same or similar numerical picture element, or pixel value, may represent a variety of image contents. This means that pixels having similar numerical values and frequency of occurrence in different parts of an image can be interchanged freely, without noticeably altering the appearance of the image or the statistical frequency of occurrence of the pixel values.

Redundancy also occurs in most types of digital information, whenever the same values are present more than once in the stream of numerical values representing the information. For a two-color, black and white FAX image, noise consists of the presence or absence of a black or white pixel value. Documents scanned into black and white BIT-MAP® format contain runs of successive black (1) and white (0) values. Noise in these images introduces a variation in the length of a run of like-colored pixels. Runs of the same length are present in many parts of the black and white image, in different rows. This allows the present invention also to be applied to facsimile transmissions.

The existence of noise and redundant pixel information in digital data permits a process for embedding auxiliary information in the noise component of digital data. Because of the fidelity of current digital communication systems, the embedded information is preserved in transmission to the receiver. Auxiliary information is constructed from host data by processing the host image pixels with a key.

The embedding of information in this manner does not increase the bandwidth required for the transmission because the auxiliary data reside in the noise component of the host data. One may convey thereby meaningful, new information in the redundant noise component of the original data without it ever being detected by unauthorized persons.

It is therefore an object of the present invention to provide apparatus and method for embedding data into a digital information stream so that the digital information is not changed significantly.

It is another object of the present invention to provide apparatus and method for thwarting unauthorized access to information embedded in normal digital data.

It is another object of the present invention to provide apparatus and method for constructing auxiliary data from host data and a digital key. The auxiliary data so constructed reproduce the information added to the host data by the embedding apparatus and method.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention there is provided a method of embedding auxiliary data into host data comprising the steps of creating a digital representation of the host data consisting of elements having numerical values and containing a noise component; creating a digital representation of the auxiliary data in the form of a sequence of bits; evaluating the noise component of the digital representation of the host data; comparing elements of the host data with the noise component to determine pairs or sequences of the host elements having numerical values which differ by less than said value of said noise component; and replacing individual values of the elements with substantially equivalent values from said pairs or sequences of elements in order to embed individual bit values of the auxiliary data corresponding to the sequence of bits of the auxiliary data; and outputting the modified host data with the auxiliary data embedded into the host data as a file.

In accordance with the purposes of the present invention there is further provided a method of constructing embedded auxiliary data from host data containing a noise component comprising the steps of interpreting host data values with a key bit-sequence corresponding to host data values that were used to embed auxiliary data, and which allows for verification of the host data. The method for constructing auxiliary data consists of interpreting the host data-element pairs or sequences which differ by less than the value of the noise component as bit values of the auxiliary data; identifying the auxiliary data bit-sequence corresponding to the pair values; and assembling the auxiliary data as a file.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIGS. 3A, 3B, and 3C are a partial listing of computer code used for determining host data pairs having similar values and for converting RGB components to HSI components.

FIG. 4 is a partial listing of computer code used for eliminating duplicate host data pairs.

FIGS. 5A and 5B are is a partial listing of computer code which, for Truecolor images, introduces a constraint on the frequency of occurrence of host data pairs that minimizes the effect of embedding on the host data histogram.

FIGS. 6A, 6B, 6C, and 6D are a partial listing of computer code that performs the actual embedding of auxiliary data into the host data, including the considerable information, which is necessary to manipulate the data in the header information, auxiliary bit-stream, and the host data files.

FIGS. 7A, 7B, 7C, and 7D are a partial listing of computer code that constructs auxiliary data from a digital key and host data.

FIGS. 8A through 8I are a partial listing of computer code that analyzes the data in a histogram to determine the general degeneracy present.

FIGS. 9A, 9B and 9C are a partial listing of computer code that analyzes the lengths of runs in a row of pixels in two-color facsimile host data.

FIG. 10 is a partial listing of computer code whose purpose is to ensure that the first pixel in a PACKET_START data row starts in an even column number. The location of the first pixel in the row flags the start of the data packets.

FIGS. 11A, 11B, 11C, and 11D are a partial listing of computer code for embedding data into two-color host images, such as facsimile transmissions.

DETAILED DESCRIPTION

Figure 1:
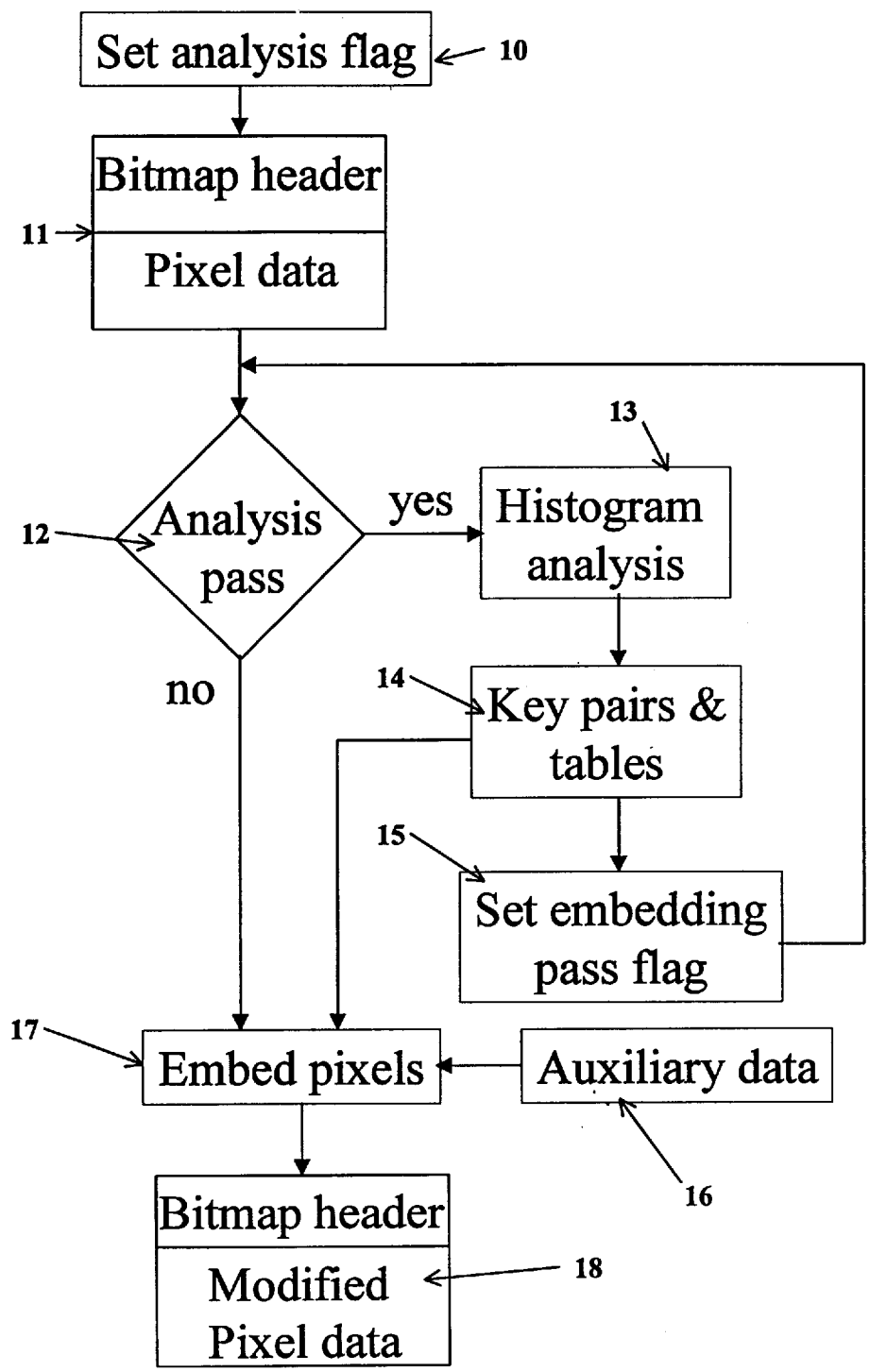
FIG. 1 is a block diagram illustrating the processes used in the embedding of auxiliary data into host data.

The present invention allows data to be embedded into a digital transmission or image without naturally discernible alteration of the content and meaning of the transmission or image. This is made possible because of the technique of the present invention, in which similar pixel values in a set of digital host data are reordered according to the desired embedded or implanted information. The host data image examples are represented in the MICROSOFT® BITMAP® (.BMP) format, so that the resulting image contains the embedded auxiliary information without that information being readily discernible.

The MICROSOFT® BITMAP® image format is a public-domain format supporting images in the Truecolor, color palette, gray-scale, or black and white representations. Truecolor images have 24-bits per pixel element, with each byte of the pixel element representing the intensity of the red, green, and blue (RGB) color component. Color palette images contain a table of the permitted RGB values. The pixel value in a color palette image is an index to this table. Grey-scale images give the numerical intensity of the pixel values. Black and white representation assigns either zero or one as one of the two possible pixel values. The invention will be made understandable in the context of the BITMAP® image types by reference to the following description.

If additional information is desired on the format used for BITMAP® images, reference should be made to two sources. One is the book, *Programming for Graphics Files*, by J. Levine, 1994 (J. Wiley & Sons, New York). The other is a technical article, "The BMP Format," by M. Luse, *Dr. Dobb's Journal*, Vol. 19, Page 18, 1994.

At the point when most sensory obtained information is represented in digital form, whether it be from video, photographs, laboratory measurements, or facsimile transmissions, the digital data contain intrinsic noise and redundant information which can be manipulated to carry extra information. Through use of this invention, the extra information also can be constructed easily by an authorized and enabled receiver of the data.

Redundancy in digital image data occurs when a particular numerical value of the digital intensity exists in many different parts of the image. Redundancy is found commonly in images because a given gray-level exists in the rendition of trees, sky, clouds, people, and other objects. The presence of noise in digital images permits the picture elements, pixels, to vary slightly in numerical value. For 8-bit digital data, the pixel numerical value ranges from 0–255. As the pixels having the same or similar numerical values represent a variety of image contents, many values in different locations of an image can be interchanged freely. The image appearance and the statistical frequency of occurrence of a particular pixel value are affected little by the interchanging of the spatial position of pixels close in numerical value.

Initially, from the original digital data (hereinafter often referred to as the "host" data), the present invention first converts the host data to digital form, if necessary, and then creates an image histogram to show the probability density of numerical pixel values occurring in the image. The number of times a particular pixel value occurs in the image is plotted versus the value. Black and white FAX images are a special case, because there exist only two possible pixel values. For FAX images, the histogram plots the number of times a particular run length of pixels occurs versus the length of the run. For 8-bit digital image data, the pixel values range from 0–255. Of course, the level of noise in an image will depend on the source of the data, with different noise levels expected between photos, original artwork, digital audio, video, and facsimile transmissions.

The actual embedding of the auxiliary data into the host data is a two-pass process, the basic steps of which are illustrated for a BITMAP® format image in FIG. 1. The first pass performs an analysis of the pixel data. The analysis is initiated by setting an analysis flag 10, in FIG. 1. The BITMAP® format data 11 consist of header data structures followed by pixel data. The invention tests the analysis flag 10 at 12 in FIG. 1 in order to determine the process flow direction. If the analysis flag is set, the pixel data are used to construct and analyze the image histogram 13. An estimate of the noise component of the host data is made and combined with the histogram of the host data numerical values, in order to identify pairs and tables of host data pixel values that occur with approximately the same statistical frequency, and that differ in value by less than the value of the noise component. The pairs and tables of pixel values 14 can be interchanged without affecting the host image significantly. After completing the analysis, the analysis flag is cleared, an embedding flag 15 is set, and the process flow returns to the test at 12 in FIG. 1.

During the second pass, the auxiliary data 16 and the pair and table key values 14 are used to rearrange the pixel values in the embedding step 17. The position of occurrence of the pair values found is adjusted to embed bits from the stream of auxiliary information 16.

The modified pixel values are combined with the header data structure to produce a modified version of the host image in BITMAP® format 18. The pairs and tables of pixel values 17 constitute a key corresponding to the host-image pixel sequence used to embed data. The use of a digital image, and specifically the BITMAP® format, in FIG. 1 serves to illustrate the invention and does not restrict the application of the invention to only that type of digital data.

Figure 2:
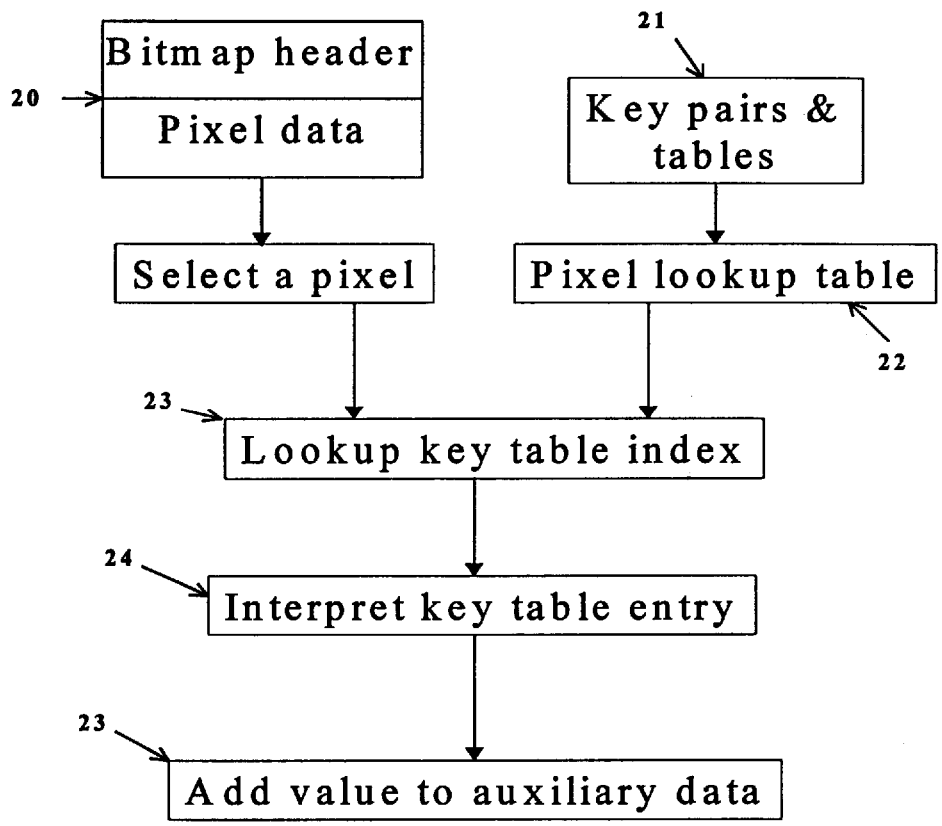
FIG. 2 is a block diagram illustrating the process used in the construction of auxiliary data from a host containing embedded data.

Host data values are interpreted according to a digital key in order to construct auxiliary data. FIG. 2 illustrates constructing auxiliary data from a digital image in BITMAP® format. The digital key 21 in FIG. 2 is used to construct a lookup table 22. The lookup table 22 consists of entries relating the pixel values to the index of pairs or tables in the digital key. For each pixel value drawn from the digital image 20, the value is entered into the lookup table to obtain the corresponding key-pair or table index. Pixel values having no key-pair or table significance have the index value −1, and are ignored. Pixels in the BITMAP® format host image are processed in the same sequence that was used to embed information into the host data.

The pixel value is used with its corresponding key-pair or key-table value to set the corresponding auxiliary data value (24). For example, the first of the two structure elements in the key table pair [k] can be taken to correspond to a zero auxiliary bit value, and the second structure element can be taken to represent a unit bit value. The lookup table values corresponding to the key index k ensures that the pixel value equals one of the two pair structure values. The appropriate auxiliary data value is selected and added to the auxiliary bit stream (25). The example of a digital image in BITMAP® format in FIG. 2 does not restrict the application of the invention to only that type of digital data.

The first auxiliary data constructed give the header information. The header information specifies the length and the file name of the auxiliary data, and serves to validate the key. If the host data containing embedded information has been modified, or the key-pair and key-table sequence is incorrect, then the header information cannot be constructed. Therefore, successful construction of the header data permits constructing the auxiliary data exactly in an output file.

The principle of data embedding according to the present invention involves the rearrangement of certain host data values in order to encode the values of the auxiliary data, which is to be added. For the purposes of this description of the invention, consider a host data set represented by eight bits of binary information, with values ranging between 0 and 255 bits for each host data sample. Further, assume that the noise value, N, for a signal, S, is given by $N=\pm S/10$, or approximately 10% of the signal value. For many host data, the noise component can be approximated by a constant value or percentage, such as the 10% value used for this description. Two values in the host data, $d_i$ and $d_j$, are within the noise value if:

$$|d_i - d_j| \leq \epsilon. \tag{10}$$

The frequency of occurrence or histogram value of a certain value, $d_i$, is $f(d_i)$. Data values meeting the criteria of Equation 10, and occurring in the host data with frequency of occurrence $f(d_i)-f(d_j)<\delta$, where $\delta$ is the tolerance imposed for statistical equality, are candidates for embedding use. The values, $d_i$ and $d_j$, constitute a pair of data values, $p_k$. There are $k=0,1,2, N_p$ such pairs in the host data set, giving a total number of embedding bits, $M_k$, for each pair:

$$M_k = \sum_i f(d_i) + \sum_j f(d_j) \tag{20}$$

where the summations for i and j run to the limits of the frequency of occurrence in the data set, $f(d_i)$ and $f(d_j)$, for the respective data values.

It is now helpful to refer to FIG. 3, wherein a partial listing of computer code in the C-Language is printed. The determination of the host data pixel pair values, $d_i$ and $d_j$, in Equation 10, is accomplished through the code listed in FIGS. 3A, 3B, and 3C. In FIGS. 3A–3C, these eight bit values are interpreted as indices in a color palette table. The comparison indicated in Equation 10 is therefore required to be a comparison between the corresponding colors in the palette. Entries in the color palette are Red, Green, and Blue (RGB) color-component values, each within the range of 0–255.

The code fragment in FIG. 3A begins at line 1 with a loop running over the number of colors in the palette. The loop index, i, is used to test each palette color against all other entries, in sequence, to identify pairs of color entries meeting the criteria established by Equation 10. Each color identified in the i-loop then is tested against all other colors in the palette by a second loop using another index, j, starting at line 16. Line 7 provides a modification for images, which have a palette for grayscale instead of colors. For grayscale images, the RGB components are identical for each palette entry, although some grayscale formats include a 16-color table as well.

The comparison indicated in Equation 10 is made by converting the Red, Green, and Blue (RGB) color component values to corresponding Hue, Saturation, and Intensity (HSI) color components. Line 12 uses a separate routine, rgbhsi( ), to effect this conversion. Line 20 converts RGB color component values in the j-loop to HSI data structure components, and line 21 calculates the color difference in the HSI system. Line 24 then implements the test required by Equation 10.

If the color difference is less than a fixed noise value (COLOR_NOISE=10 in the listing of FIG. 2), the intensity difference is tested to determine if the two palette entries are acceptable as differing by less than the noise value specified. Two additional constraints are imposed before accepting the entries as candidate pair values. First, the difference in color is required to be the smallest color difference between the test (i-loop) value, and all the other (j-loop) values. Second, the number of pairs selected (k) must be less than half the number of columns in a row of pixels in the image, in order for the pair-value key to be stored in a single row of pixels. This is an algorithmic constraint, and is not required by the invention.

A data-structure array, pair [], is used to hold the values of candidate pairs (i,j) and their total frequency of occurrence, $M_k$. If the image is a grayscale palette, the test at line 35 is used to force comparison of only the intensity of the two palette entries. Grayscale images do not require the RGB to HSI conversion made for color palettes.

The embedding process of the present invention ignores differences in the saturation component of color palette entries because saturation is ordinarily not noticeable in a color image. Only the Hue and Intensity components are constrained to fall within fixed noise limits to determine the palette pair values.

The pixel pair values that are found by the code listed in FIGS. 3A–3C include generally redundant values. The same pixel value, i, is found in several different pair combinations. Because multiple pairs cannot contain the same palette entry, due to each pair combination of pixel values having to be unique, it is necessary to eliminate some pairs. The number of pairs located by applying the criterion of Equation 10 is stored in the variable, no_pairs, in line 51.

Referring now to FIG. 4, the code fragment listed therein illustrates the manner in which duplicate pairs are eliminated by a separate routine. First, the histogram of the image is used to calculate the total number of occurrences in each pair, as required by Equation 20, above. Line 1 shows the i-loop used to calculate the value, $M_k$, for each pair. Next, the pairs are sorted according to decreasing order of the pair[].count data-structure member in line 5. The elimination of duplicates in the following line retains the pairs, $p_k$, having the largest total number of frequency values, $M_k$. Line 10 and the lines following calculate the total number of bytes that can be embedded into the host data using the unique pixel pairs found by this code fragment.

Sorting the pair values in decreasing order of value, $M_k$, minimizes the number of pairs required to embed a particular auxiliary data stream. However, the security of the embedded data is increased significantly if the pair values are arranged in random order. Randomizing the pair-value order is part of this invention. This is accomplished by rearranging the pair-values to random order by calculating a data structure having entries for an integer index table pts[k].i, for k=0,1,2, . . . , no_pairs; and pts[k].gamma=$\delta_0$, $\delta_1$, . . . $\delta_r$, . . . $\delta_{no\text{-}pairs}$, where the $\delta_r$ values are random. Sorting the data structure, pts[], to put the random values in ascending order randomizes the index values. The random index values are used with the pair-values calculated as indicated above, to re-order the table to give random pair-value ordering.

The algorithm described for palette-format images permits manipulating pixel values without regard to the individual frequency of occurrence. Reference should now be made to FIG. 5 where another code fragment is listed in which, for Truecolor images, a constraint is introduced on the frequency of occurrence that minimizes the effect of embedding on the host data histogram.

Truecolor images consist of three individual 8-bit grayscale images, one each for the red, green, and blue image components. Truecolor images have no color palette. The possible combinations of the three 8-bit components give approximately 16 million colors. The present invention embeds data into Truecolor images by treating each RGB color component image separately. The effect of embedding on the composite image color is therefore within the noise value of the intensity components for the individual colors.

In FIG. 5A and 5B, the ip-loop starting in line 2 refers to the color plane (ip=0,1,2 for R,G,B). The frequency of occurrence of each numerical value (0 through 255) is given in the array, hist_values[], with the color plane histograms offset by the quantity, ip*256, in line 7. The variable, fvalue [], holds the floating point histogram values for color-component, ip. Line 11 begins a loop to constrain the pairs selected for nearly equal frequency of occurrence. Pixel intensities within the noise limit, RANGE, are selected for comparison of statistical frequency. The tolerance, $\delta$, for statistical agreement is fixed at 5% in line 17. This tolerance could be adjusted for particular applications.

After all possible values are tested for the constraints of noise and statistical frequency, the pairs found are sorted in line 27, the duplicates are removed, the starting index is incremented in line 31, and the search continued. A maximum number of pairs again is set by the algorithmic constraint that the i- and j-pair values must be less than one-half the number of pixels in an image row. As with palette-format images, the security of the invention includes randomizing the pair-value entries.

Applying the statistical constraint minimizes the host image effects of embedding the auxiliary data. If the tolerance, $\delta$, is set at 0, each pair chosen will contain data values less than the noise value in intensity separation, and occurring with exactly the same statistical frequency. Setting the tolerance at $\delta$=5%, as in the code fragment of FIG. 5, permits the acceptance of pixel pairs that are close in frequency, while still preserving most of the statistical properties of the host data. Few, if any, pairs might be found by requiring exactly the same frequency of occurrence.

The actual embedding of auxiliary data into a set of host data consists of rearranging the order of occurrence of redundant numerical values. The pairs of host data values that are found by analysis are the pixel values used to encode the bit-stream of the auxiliary data into the host data. It is important to realize that the numerical values used for embedding are the values already occurring in the host data. The embedding process of the current invention does not alter the number or quantity of the numerical values in the host data.

In the embedding process of the present invention, the host data are processed sequentially. A single pass through the auxiliary data examines the sequential bits of the data to be embedded, and sets the pair-value of the host data element to the value i or j, according to the auxiliary bit value to be embedded. If the bit-stream being embedded is random, the host data pair-values, i and j, occur with equal frequency in the host image after the embedding process is completed.

FIGS. 6A–6D illustrate the code fragment that performs the actual embedding, including the considerable information, which is necessary to manipulate the data in the header information, auxiliary bit-stream, and the host data files. Lines 1–12 allocate memory and initialize variables. The header and bit-stream data to be embedded are denoted the "data-image," and are stored in the array, data_row[]. The host data are denoted the "image-data."

The index, li, is used in a loop beginning at line 12 to count the byte position in the data-image. The loop begins with li=−512 because header information is embedded before the data-image bytes. Line 14 contains the test for loading data_row[] with the header information. Line 20 contains the test for loading data_row[] with bytes from the data-image file, tape5.

Line 30 starts a loop for the bits within a data-image byte. The variable, bitindex=(0,1,2 . . . 7), counts the bit position within the data-image byte, data_row[$d_{13}$ inrow], indexed by the variable, d_inrow. The variable, lj, indexes the byte (pixel) in the host image. The variable, inrow, indexes the image-data buffer, image_row[inrow]. Line 32 tests for output of embedded data (a completed row of pixels) to the image-data file, and line 40 tests for completion of a pass through the image-data. One pass through the image-data is made for each of the pixel pairs, pair[k], k=0,1,2 . . . $N_p$.

In line 47, the pair index is incremented. A temporary pair data-structure variable named pvalue is used to hold the working pair values of the host data pixels being used for embedding. Line 60 provides for refreshing the image-data buffer, image_row.

The embedding test is made at line 72. If the image_row [inrow] content equals the pair value representing a data-image bit of zero, no change is made, and the image-data value remains pvalue.i. However, if the bit-stream value is one, the image-data value is changed to equal pvalue.j. Line 84 treats the case for image-data values not equal to the embedding pair value, pvalue.i. In this case, the bitindex variable is decremented, because the data-image bit is not yet embedded, and the image-data indices are incremented to examine the next host-data value.

Host data containing embedded information are the source for constructing auxiliary data from an embedding key. With the noise key known, auxiliary data construction consists of sequentially testing the pixel values to construct an output bit-stream for the header information and the data-image. FIGS. 7A–7D show a listing of code that constructs auxiliary data from an embedding key.

The construction of auxiliary data is accomplished by processing host data with a digital key. A histogram analysis of any host image-data set will reveal candidate pairs for embedding. However, for only the unlikely case where the individual statistical frequencies are identical to the host image frequencies will the pairs found match the ones used for the embedding process. In the listings of FIGS. 6A–9C, the statistical frequencies are always changed slightly by the embedding process. The pairs of host data values selected for embedding are a "noise key." The noise key used for embedding can be constructed by analysis of the original image-data, but it cannot generally be recovered exactly from the embedded image-data. Additionally, as described above, the invention includes randomizing the order of the pair-values, thereby increasing greatly the amount of analysis needed to construct auxiliary data without prior knowledge of the pair-value order.

As previously described, the ordered pairs selected for embedding constitute the "key" for construction of the auxiliary data-image from the image-data. The listings illustrated in FIGS. 6A–9C demonstrate how embedding analysis reduces the statistical properties of the noise component in host data to a table of pairs or sequences of numerical values. The key-pairs or sequences are required for auxiliary data construction, but they cannot be generated by analyzing the host data after the embedding process is completed. However, the key can be constructed from the original, unmodified host data. Thus, data embedding is similar to one-time-pad encryption, providing extremely high security to the embedded bit-stream.

Data embedding as taught above uses pairs of data values to embed one bit of auxiliary information. The location of each host-data-pair value corresponds to a zero- or one-bit auxiliary data value. The method taught can be generalized to utilize better the noise present normally in the host data. Depending on the noise criteria used to identify the data values that can be exchanged, more than two host data values can represent equally well, an average host value. The cases for which several host data values can be exchanged constitute host data degeneracy, wherein the noise permits any one of several possible values to be used to encode the auxiliary information. Generalizing, the number of degenerate values is a binary power $2^n$, each degenerate value can be used to encode a unique combination of n bits.

In the general case, data encoding follows a degeneracy constraint, wherein the required number of degenerate data values N is an integral binary power:

$$N=2^n, n>0; (n=1,2,3 \ldots ). \tag{30}$$

In the example taught above, n=1. Thus, N=2 (paired) data values encode uniquely a single bit. For n=2, the degeneracy is N=4, meaning that four data values are needed to encode uniquely all possible combinations of two bits. For n=3, each of the N=8 degenerate data values encode 3-bit combinations (octals) of auxiliary data.

According to the constraint in equation 30, some host value degeneracies are not permitted. For example N=5 is not allowed, because the degeneracy does not correspond to an integral number bit combination. Practically, this constraint is not a significant limitation because the unused degeneracy is incorporated into in N=2 (pair) embedding combinations, as taught above.

Generalizing the embedding algorithm to the limits of the host data degeneracy increases the amount of auxiliary data that can be embedded. Analysis consists of identifying the degeneracy present in the histogram of data values. Data embedding of the auxiliary information proceeds according to the hierarchical sequence of the degenerate host data values, starting with the largest degeneracy, and moving toward pair embedding.

The improvement in efficiency of the embedding algorithm can be seen by recognizing that for a particular degeneracy N, each host data value embeds the n bits of auxiliary data. Thus, the total number of bits embedded by N-fold degenerate host data values is $$T_n=Nn=N \log_2 N. \tag{40}$$

For N=2, $T_1$=2 bits are embedded. Embedding with an N=4 degeneracy embeds $T_2$=8 bits and is therefore more efficient by the factor $T_2/T_1$=4. Embedding with N=8-fold degeneracy is 12 times more efficient than pair embedding as taught above. Hierarchical embedding with degenerate host-data values increases significantly the size of the noise-channel in the host data.

The embedding algorithm for a degenerate hierarchy of host data values is table-driven. Each member of the N-fold degenerate host-data values corresponds to a unique combination of n bits. The assignment of the correspondence of the N data values to the bit combinations they encode is arbitrary, and the security of the embedded information is thereby increased significantly.

FIG. 8 shows a code fragment used to analyze the histogram of a Truecolor image for degenerate pixel values. Line 2 starts the analysis of the Truecolor histogram data. Line 9 tests the variable table_flag to select the code path for analyzing degenerate pixel values. The loop over the variable ip, starting at line 23, processes the three color-component image planes in the Truecolor image. The histogram data for each color plane is analyzed separately.

The algorithm in FIGS. 8A–8I processe the histogram data by examining first the histogram frequency, or ordinate, values to identify potential pixel, or abscissa, values. Next, the pixel values are examined to apply the constraint of equation 10, and to identify sets of degenerate pixels. The histogram frequency values are processed starting with the value specified by htest, to the value specified by the variable hist_stop. In this example, the limits for processing the histogram are set by the defined value RANGE, which is interpreted as a percentage value. Thus, for RANGE=10, the value of hist_stop is 10% below the maximum frequency of occurrence in the histogram. The value of htest varies, as degenerate pixels are located. The variable nvalue[] is an array of histogram (ordinate) values corresponding to the pixel (abscissa) values.

The loop starting at line 44 transfers histogram, or ordinate, values to the array nvalue[], for subsequent examination, and determines the maximum histogram value.

Line 55 starts a loop over the histogram frequency, or ordinate, values.

The variable li indexes the ordinate loop. The value j for the range of the ordinate analysis that begins with the value li reflects the percentage error specified by the RANGE value. Any degenerate abscissa values must be found within the limits in frequency indexed by li and j. The range permitted for the ordinate values is calculated in line 61. The loop over the histogram starts at line 62, and it is incremented by the range of examination, htest. The examination range varies with the ordinate value. The variable lj is used to expand the range as the frequency value, li, increases in the loop.

The pixel, or abscissa value, is indexed by a loop starting at line 67. For the limited range of ordinate values selected, the loop examines the entire range of pixel, or abscissa, values. All the abscissa values within the ordinate range are saved, and stored in the array variable htable[], in lines 71–74. The variable n counts the number of pixel values having frequency within the htest range. The entries in htable[] for pixels outside the acceptable ordinate range are set to zero.

A test at line 77 controls the execution flow after the htable[] array is filled. If fewer than two degenerate values are located, the histogram loop indexes upward toward the hist_stop value. If more than two values are located, there is degeneracy in the pixel data. A second loop over the pixel (abscissa) values starts at line 80. The pixels found above, and stored in the array htable[], are tested against the criterion in equation 10. Pixels meeting within the error range in frequency of occurrence and pixel value are degenerate, and may be exchanged freely in the embedding algorithm. We refer to a group of degenerate pixels by using the term "cluster." The number of pixels in a cluster is calculated in the loop starting at line 87, and is stored in the variable ncluster.

Code starting at line 91 selects the integral cluster sizes permitted by equation 40, for N=4,8,16,32. Clusters larger than 32 are not likely to occur in image data, and clusters of two pixels are treated as pairs, as taught above.

Line 95 begins the processing of clusters located between the index value i and j, in the htable[] array. An array of data structures named ctable [] is used to retain the information on clusters of degenerate pixels. The element ctable[cndx].total contains the number of bits embedded by the cluster values, the element ctable[cndx].ncluster contains the number of pixels in the cluster, and the element ctable[cndx].values[] is an array containing the pixel values in the cluster.

The loop starting at line 104 stores the pixel values in the appropriate cluster structure. A separate routine named check_table( ) is called in line 106 to ensure the pixel values are unique, belonging to only one of the cluster structure elements.

Line 116 tests the cluster member counter variable, nx. The variable decrements to zero if the requisite number of unique cluster elements are located in the loop above. In the event that nx differs from zero, the cluster elements are processed as pairs by branching to the label DEUX from line 116.

Line 126 starts a loop to total the number of embedding bits that can be processed by the clusters. The variable ip_total is the running total of the number of bits that can be embedded into the Truecolor plane indexed by ip. Line 134 completes the loop over the cluster histogram ordinate values, indexed by li.

Lines 135, 136 provide a code path to process the pixel values as embedding pairs, as taught above. Pairs are processed if the number of entries in the htable[] array is less than eight, or the htable[] array contains an insufficient number of unique values to form a cluster.

The variable n contains the number of pairs to locate in the htable [] data. Line 239 starts a loop to locate and store the pair data into the structure array pair[]. Line 156 tests the variable n to determine when the pair processing is complete.

Line 164 completes the loop started at line 80, over the abscissa values in the htable[] array. The variable i increments, and the cluster and pair search repeats.

Analysis of the histogram produces tables of the pixel values ordered into clusters or pairs. The table is referred to as the "noise key." Embedding data with clusters of pixels follows the method taught above, for pairs of pixels. However, when clusters are used for embedding, the pixel values represent groups of bits corresponding to the level of degeneracy of the cluster. Thus, clusters containing eight pixel elements encode three bits per pixel value instead of the single bit embedded by pixels in a pair.

The method taught above applies constraints to ensure the host data histogram is modified by a minimal amount. In consequence, the method taught is nearly adiabatic, because the image entropy is affected minimally. The host image responds approximately the same to loss-less compression, whether it contains embedded data or not. The embedding method can be relaxed by selecting the clusters and pairs of host data values without regard to the constraints applied in the method taught above. Unconstrained embedding is non-adiabatic, because the image entropy changes and the response to loss-less compression is affected. However, non-adiabatic data embedding increases substantially the amount of auxiliary information that can be embedded. For non-adiabatic embedding, an amount of auxiliary data equaling approximately 10% of the host image size can be embedded with little visible degradation of the host image quality.

In the present invention, the noise key is inserted into the host image-data, where it is available for the purpose of constructing the auxiliary data. Optionally, the present invention permits removing the noise key, and storing it in a separate file. Typically, the noise key ranges from a few, to perhaps hundreds of bytes in size. The maximum table size permitted is one-half the row length in pixels. With the noise key missing, the embedded data are secure, as long as the original host image-data are unavailable. Thus, the embedding method gives security potential approaching a one-time-pad encryption method.

Another way of protecting the noise key is to remove the key and encrypt it using public-key or another encryption process. The present invention permits an encrypted key to be placed into the host image-data, preventing the construction of auxiliary data by unauthorized persons.

Embedding auxiliary data into a host slightly changes the statistical frequency of occurrence of the pixel values used for encoding the bit-stream. Compressed or encrypted embedding data are excellent pseudo-random auxiliary bit-streams. Consequently, embedding auxiliary data having pseudo-random properties minimizes changes in the average frequency of occurrence of the values in the embedding pairs. Embedding character data without compression or encryption reduces significantly the security offered by the present invention.

The existence of embedded data is not detected easily by analyzing the embedded image-data, because it is not apparent how to recover the correspondence between the pixel values and the clusters and pairs used for embedding. The changes made to the histogram of the data by embedding data into image-data modify the results of an analysis.

When viewed as a cryptographic method, data embedding convolutes the data-image with the image-data. The original data-image bit-stream embedded into the host-image represents a plaintext. The combination of the host and embedded data implants ciphertext in the noise component of the host. The existence of ciphertext is not evident however, because the content and meaning of the host carrier information is preserved by the present invention. Data embedding according to the present invention is distinct from encryption because no obvious ciphertext is produced.

Those who are unfamiliar with the terms "plaintext," and "ciphertext" can refer, for example, to B. Schneier, *Applied Cryptography Protocols, Algorithms, and Source Code in C*, J. Wiley & Sons, New York, N.Y., 1994. This reference is incorporated herein by reference.

As mentioned previously, the present invention is useful in the embedding of auxiliary information into facsimile (FAX) data. In the previous discussion concerning embedding auxiliary information into image host data, the noise component originates from uncertainty in the numerical values of the pixel data, or in the values of the colors in a color pallet.

Facsimile transmissions are actually images consisting of black and white BITMAP® data. The data from image pixel are binary (0,1) values representing black or white, respectively, and the effect of noise is to either add or remove pixels from the data. The present invention, therefore, processes a facsimile black-and-white BITMAP® image as a 2-color BITMAP®.

The standard office FAX machine combines the scanner and the digital hardware and software required to transmit the image through a telephone connection. The images are transmitted using a special modem protocol, the characteristics of which are available through numerous sources. One such source, the *User's Manual for the EXP Modem* (UM, 1993), describes a FAX/data modem designed for use in laptop computers. FAX transmissions made between computers are digital communications, and the data are therefore suited to data embedding.

As has been previously discussed with relation to embedding into images, the FAX embedding process is conducted in two stages: analysis and embedding. In the case of a FAX 2-color BITMAP®, image noise can either add or subtract black pixels from the image. Because of this, the length of runs of consecutive like pixels will vary.

The scanning process represents a black line in the source copy by a run by of consecutive black pixels in the two-color BITMAP® image. The number of pixels in the run is uncertain by at least ±1, because of the scanner resolution and the uncertain conversion of original material to black-and-white BITMAP® format.

Applying data embedding to the two-color BITMAP® data example given here therefore consists of analyzing the BITMAP® to determine the statistical frequency of occurrence, or histogram, of runs of consecutive pixels. The embedding process of the present invention varies the length of runs by (0,+1) pixel according to the content of the bit-stream in the auxiliary data-image. Host data suitable for embedding are any two-color BITMAP® image that is scaled in size for FAX transmission. A hardcopy of a FAX transmission can be scanned to generate the two-color BITMAP®, or the image can be created by using FAX-printer driver software in a computer.

The FAX embedding process begins by analyzing the lengths of runs in each row of pixels. The implementation of this step is illustrated by the code fragment in FIG. 9. The arguments to the routine rowstats( ) are a pointer to the pixel data in the row, which consists of one byte per pixel, either a zero or a one in value; a pointer to an array of statistical frequencies; the number of columns (pixels) in the data row; and a flag for internal program options. The options flag is the size of blocks, or packets, of the auxiliary bitstream to be embedded. The options flag is tested in line 9, and the routine, packet_col( ) is used for a positive option flag. The packet_col( ) routine is given in the listing of FIGS. 9A–9C, and its purpose is to ensure that the first pixel in the data row starts in an even column number. The location of the first pixel in the row flags the start of the data packets, which will be further described below.

Line 12 begins a loop to examine the runs of pixels in the data row. Runs between the defined values MINRUN and MAXRUN are examined by the loop. The j-loop, and the test at line 15, locate a run of pixels, and set the variable, k, to the index of the start of the run. The test at line 21 selects only blocks of pixels having length, i, less than the length of the row. The loop in line 22 moves the pixel run to temporary storage in the array block[].

The two tests at lines 24 and 25 reject blocks having run lengths other than the one required by the current value of the i-loop. The embedding scheme selects blocks of length, i, for embedding by adding a pixel to make the length i+1. This assures that the run can contain either i or i+1 non-zero pixel values, according to the bit-stream of the auxiliary embedded data. If the run stored in the variable block array does not end in at least two zeroes, it is not acceptable as a run of length, i+1, and the code branches to NEXT, to examine the next run found.

Line 28 begins a loop to count the number of pixels in the run. The number found is incremented by one in line 31 to account for the pixel added to make the run length equal to i+1. Line 33 contains a test ensuring that the run selected has the correct length. The histogram[] array for the run-length index, i, is incremented to tally the occurrence frequency of the run. The data row bytes for the run are flagged by the loop in line 36, with a letter code used to distinguish the runs located. This flagging technique permits the embedding code to identify easily the runs to be used for embedding the bit-stream. On exit from this routine, the data row bytes contain runs flagged with letter codes to indicate the usable pixel positions for embedding the bit-stream. The return value is the number of runs located in the data row. A return of zero indicates no runs within the defined limits of MINRUN and MAXRUN were located.

FAX modem protocols emphasize speed, and therefore do not include error-correction. For this reason, FAX transmissions are subject to dropouts, to impulsive noise, and to lost data, depending on the quality of the telephone line and the speed of the transmission. For successful embedding, the present invention must account for the possible loss of some portion of the image data. To accomplish this, a variation of modem block-protocols is used to embed the header and the auxiliary data. The two-color image is treated as a transmission medium, with the data embedded in blocks, or packets, providing for packet-start flags, and parity checks. The start of a packet is signaled by an image row having its first pixel in an even column. The packet ends when the number of bits contained in the block are constructed, or, in the case of a corrupted packet, when a packet-start flag is located in a line. A checksum for parity, and a packet sequence number, are embedded with the data in a packet. Using this method, errors in the FAX transmission result in possible loss of some, but not all, of the embedded data.

The amount of data lost because of transmission errors depends on the density of pixels in the source image and the length of a dropout. Using 20 bytes per packet, a large dropout in transmission of standard text results in one or two packets of lost data. Generally, the success of the invention follows the legibility of the faxed host image information.

Turning now to FIG. 10, there can be seen a listing of the steps necessary to initialize the two-color BITMAP® lines to flag the start of each packet. Each row in the two-color image contains a non-zero value beginning in an even column (packet start), or in an odd column (packet continuation).

In FIG. 10, it can be seen that line 4 starts a loop over the number of pixels in a data row. In FAX images, a zero (0) pixel value indicates a black space, and a one (1) value indicates a white space. Line 5 locates the first black space in the data for the row. If the variable, packet_size, is positive, the column index is tested to be even and the pixel is forced to be a white space. If the packet_size variable is negative, the routine returns an indicator of the data row flag without making changes. If packet_size is greater than zero, the first data row element is flagged as a white space. Line 11 deals with the case in which packet_size=0, indicating a continuation row. In case of a continuation row, the first data row element is forced to a black space. The values returned by subroutines in lines 17–20 show that the nature of the pixel row examined.

The code fragment listed in FIGS. 11A–11D provide auxiliary data embedding into two-color BITMAP® FAX images. The pixels in a row are processed as described above by examining the contents of the data row after it has been analyzed and flagged with letter codes to indicate the run lengths. Lines 1 through 49 are part of a large loop (not shown) over the pixel index, lj, in the two-color BITMAP® image. Lines 1–26 handle the reading of one line of pixels from the two-color BITMAP®, and store the row number of the image in the variable, nrow, in line 1. The pixel value bits are decoded and expanded into the image_row[] array in lines 12–36. The image_row[] array contains the pixel values stored as one value (0 or 1) per byte.

Line 28 uses the packet_col( ) routine to return the packet-index for the row. If j is zero in line 28, the row is a packet-start row, and if j is one, the row is a continuation row. Line 29 uses the rowstats( ) routine to assign run-length letter flags to the pixels in the row buffer. The return value, i, gives the number of runs located in the image row. Consistency tests are made at lines 31, 37, and 41. The index, kp, gives the pixel row number within a data packet. If kp is 0, the line must be a packet-start line, and if kp>0, the line must be a continuation line. Line 49 completes the process of reading and preprocessing a row of two-color image data.

The data-structure array, pair[], contains the run length for (i), the augmented run length, (i+1), and the total number of runs in the two-color BITMAP® image. The index, k, in the loop starting at line 51, is the index for the run lengths being embedded. The index, inrow, counts pixels within the image row buffer, and the variable, bitindex is the bit-position index in the bit-stream byte.

Line 57 sets the value of the run-length letter-code in the variable, testltr. The value of an image pixel is tested against the letter-code in line 58. If the test letter-code flag is located, line 60 advances the index in the row to the end of the pixel run being used for embedding. The test in line 62 checks the value for the current bit index in the bit-stream packet byte. If the value is one, the last pixel in the run is set to one. Otherwise, the last pixel in the run is set to zero.

Setting the value of the pixel trailing a run implements the embedding in the two-color BITMAP® images by introducing noise generated according to the pseudo-random bit-stream in the packet data. The letter flag values written into the row buffer by the call to rowstats( ) in FIG. 10 are reset to binary unit value before the image_row[] array data are packed and written back to the .BMP format file. The process for doing this is not illustrated in FIG. 10, but is straightforward for those skilled in the art.

Auxiliary data construction from a two-color BITMAP® FAX image, according to the present invention, can be accomplished only if the transmission of the FAX is received by a computer. The image data are stored by the receiving computer in a file format (preferably a FAX compressed format), permitting the processing necessary to convert the image to BITMAP® format and to construct the auxiliary data. FAX data sent to a standard office machine are not suited to auxiliary data construction because the printed image is generally not of sufficient quality to allow for recovery of the embedded data through scanning.

However, the invention does apply to scanning/printing FAX machines that process data internally with computer hardware. Auxiliary embedded data are inserted after the scanning of the host data, but prior to transmission. The construction of auxiliary data from a fax host image occurs after they have been received, but before they are printed.

The key for two-color image embedding can be recovered by analyzing the embedded image, because the run lengths are not changed from the original (i,i+1) values. The order in which the values are used depends on the frequency of occurrence in the image. As in the example for palette-color images, a key to the value and order of the pairs used for embedding is inserted into the FAX. However, the key is not strictly required, because, in principle, knowledge of the defined values MINRUN and MAXRUN permits re-calculating the run-length statistics from the received image. In practice, the key is required because transmission errors in the FAX-modem communication link can introduce new run-lengths that alter the statistical properties of the image, and because the pair ordering is not known. Even though FAX embedding is somewhat less secure than embedding auxiliary data into palette-color images, the two-color BITMAP® FAX embedding of data still can be regarded as similar to one-time-pad cryptography.

Figure 12:
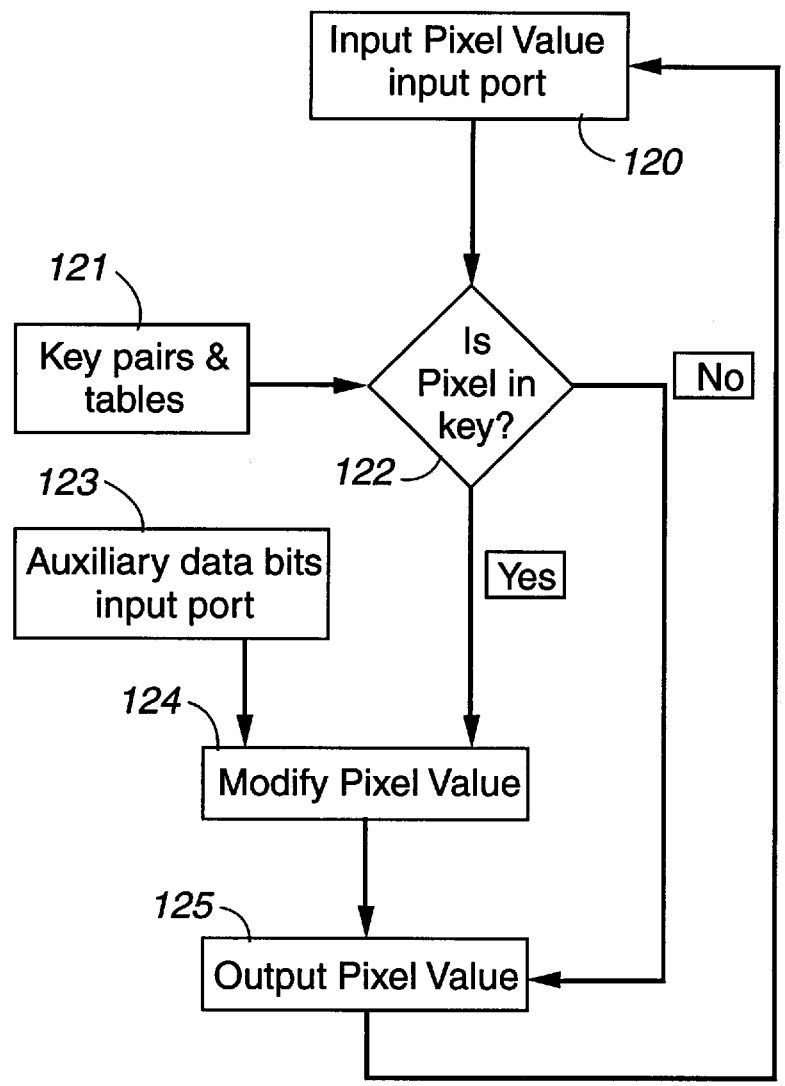
FIG. 12 is a block diagram of chipset hardware for embedding data into a host data stream.

Data embedding can be implemented in hardware, in the form of an integrated circuit chip packaged for mounting in a circuit board. FIG. 12 shows a method for processing an input pixel value presented to the chipset on a hardware data bus. A digital key that specifies the embedding pair and table values is formed by processing the pixel data as taught above, and stored in embedding key memory 121 located on the chip. In FIG. 12, an input pixel 120 enters the chip on an external data port. Auxiliary data bits enter the chip on a separate port 123. The key-pairs and values are known to the chipset and the input pixel is tested (122) against the key values to determine if it is usable for embedding.

If the input value is not a key-value, it passes to the output pixel stream 125 and the next value is selected from the input pixel port. If the input pixel-value matches a key-value, then bits from the auxiliary data port 123 are used with the stored key data 121 to modify the input pixel value 124, and the result passes to the output pixel port 125. Processing continues until all the auxiliary data bits are embedded, after which the remainder of usable key-pair values is filled with random bit-values.

Figure 13:
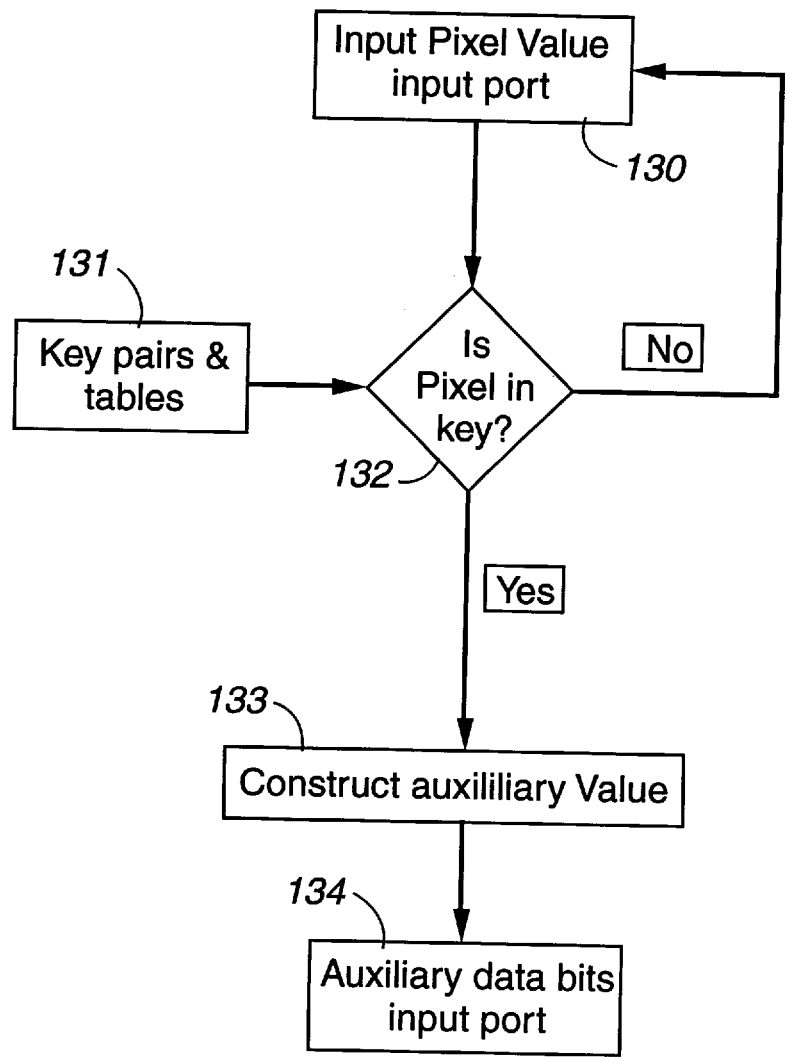
FIG. 13 is a block diagram of chipset hardware for constructing auxiliary data from a host data stream and a digital key.

Auxiliary data is constructed in hardware by processing pixel data as is shown in FIG. 13. Pixel data containing embedded information enters the integrated circuit chip through an input port 130. The key-pair and key-table data are stored in memory that is accessed by the chip, or co-located with the processing circuitry on the chip 131. An input pixel is tested against the key-data to determine if any value matches 132. If no match exists, the next pixel value is taken from the input port 130. If a match exists, then the key-value is used to construct auxiliary data bits 133 and the auxiliary data are output on data port 134.

The circuitry to embed and construct auxiliary data can be combined into a single integrated circuit chip. The chip contains a provision for memory access to the key-pair and table values, and bi-directional ports or registers for receiving and transmitting pixel and auxiliary data.

The foregoing description of the preferred embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of embedding auxiliary data into host data comprising the steps of:

creating a digital representation of said host data in the form of elements having numerical values and containing a noise component;

creating a digital representation of said auxiliary data in the form of a sequence of individual bit values;

evaluating said noise component of said digital representation of said host data;

comparing the values of said elements with said noise component to determine degenerate clusters of four or more said elements having numerical values which differ by less than said value of said noise component;

replacing individual values of said elements with equivalent values taken from said degenerate clusters of said elements in order to embed bit values of said auxiliary data corresponding to said sequence of bit values of said auxiliary data; and outputting said host data with said auxiliary data embedded into said host data as a file.

2. The method as described in claim 1 further comprising the step of combining said auxiliary data with predetermined information indicative of said auxiliary data, its file name, and file size, said step to be performed after the step of digitizing said auxiliary data.

3. The method as described in claim 1 further comprising the step of determining a protocol for embedding said auxiliary data into said host data which allows for verification of said auxiliary data upon construction from said host data.

4. A method of constructing auxiliary data from host data containing a noise component comprising the steps of:

constructing from said host data a bit sequence indicative of said embedded auxiliary data, and which allows for verification of said host data;

interpreting said host data to determine host element degenerate clusters and two or more pairs which differ by less than said noise component and which correspond to bit values of said auxiliary data;

identifying said auxiliary data using said bit sequence; and constructing said auxiliary data as a file.

5. The method as described in claim 1; wherein said host data comprises a color photograph.

6. The method as described in claim 1; wherein said host data comprises a black and white photograph.

7. The method as described in claim 1; wherein said host data comprises a television signal.

8. The method as described in claim 1; wherein said host data comprises a painting.

9. The method as described in claim 1; wherein said host data comprises a facsimile transmission.

10. The method as described in claim 1; wherein said host data comprises an identification card.

11. The method as described in claim 1, wherein said host data comprises digital audio information.

12. The method as described in claim 1, wherein said host data comprises a digital image and said auxiliary data comprises picture elements removed from said host data to form a digital watermark signature.

13. Apparatus for embedding auxiliary data into host data that can be serialized to a sequence of host-data element values:

input port means receiving said individual host-data element values in an ordered sequence;

key-pair table, key-table, and key-value means receiving said embedding pair candidate values, and retaining said key-pair table, key-table, and key-value for reference purposes;

input port means presenting host-data and auxiliary data values in an ordered sequence;

output port means presenting modified host-data values or constructed auxiliary data values in an ordered sequence.

14. The apparatus as described in claim 13 wherein said input and output port means and said key-pair table means are contained within a chipset.

15. The apparatus as described in claim 13 wherein said key-value table, said input means, and said output means are implemented with discrete components in circuit board circuitry.

16. Apparatus for constructing auxiliary data from a key-pair table, or a key-table embedded into individual frames of host data presented in sequence to said input port:

look-up table means receiving said key-pair table from said input port containing individual host-data values for extracting said key-pair table and outputting a key-pair index corresponding to each of said host-data values from said input port sequence of host data; and auxiliary data construction means comparing said key-pair table with said input port host-data values and using said key-pair table to construct said auxiliary data from said embedded host-data data and presenting said auxiliary data to said output port.

17. The apparatus as described in claim 16 wherein said look-up table means and said auxiliary data construction means are contained within a chipset.

18. The apparatus as described in claim 16 wherein said look-up table means and said auxiliary data construction means are implemented by discrete components in circuit board circuitry.

* * * * *